United States Patent
Smith, III

(10) Patent No.: US 6,474,359 B1
(45) Date of Patent: Nov. 5, 2002

(54) UNDERSEA HYDRAULIC COUPLING MEMBER

(75) Inventor: Robert E. Smith, III, Missouri City, TX (US)

(73) Assignee: National Coupling Company, Inc., Stafford, TX (US)

(*) Notice: Subject to any disclaimer, the term of this patent is extended or adjusted under 35 U.S.C. 154(b) by 0 days.

(21) Appl. No.: 09/521,250

(22) Filed: Mar. 8, 2000

(51) Int. Cl.[7] ............................. F16K 17/26; F16L 37/28
(52) U.S. Cl. ..................................................... 137/493.9
(58) Field of Search ............................. 137/493, 493.1, 137/493.3, 493.6, 493.9, 508, 509, 614.04, 614

(56) References Cited

U.S. PATENT DOCUMENTS

| | | | |
|---|---|---|---|
| 2,645,242 A | * 7/1953 | Monnich | 137/493.9 |
| 2,730,124 A | * 1/1956 | Buchanan | 137/493.6 |
| 2,854,258 A | 9/1958 | Hickey et al. | |
| 3,215,161 A | 11/1965 | Goodwin et al. | |
| 3,348,575 A | 10/1967 | Simak | |
| 3,498,324 A | 3/1970 | Breuning | |
| 3,550,624 A | 12/1970 | Johnson | |
| 4,193,576 A | 3/1980 | White | |
| 4,582,295 A | 4/1986 | Kugler et al. | |
| 4,625,755 A | * 12/1986 | Reddoch | 137/327 |
| 4,691,620 A | 9/1987 | Kao | |
| 4,745,948 A | 5/1988 | Wilcox et al. | |
| 4,768,551 A | 9/1988 | Allread et al. | |
| 4,858,648 A | * 8/1989 | Smith, III et al. | 137/614.04 |
| 4,926,902 A | * 5/1990 | Nakamura et al. | 137/493.6 |
| 5,311,901 A | * 5/1994 | Ostrom | 137/493.3 |
| 5,355,909 A | * 10/1994 | Smith, III | 137/614.04 |
| 5,365,972 A | 11/1994 | Smith, III | |
| 5,370,153 A | * 12/1994 | Galle | 137/614.04 |
| 5,469,887 A | 11/1995 | Smith, III | |
| 5,692,538 A | 12/1997 | Smith, III | |
| 5,778,925 A | * 7/1998 | Cooke | 137/493.6 |
| 5,950,669 A | * 9/1999 | Fehlmann et al. | 137/493.3 |
| 6,196,201 B1 | * 3/2001 | Fehlmann et al. | 137/493.3 |

* cited by examiner

Primary Examiner—George L. Walton
(74) Attorney, Agent, or Firm—Trop, Pruner & Hu, P.C.

(57) ABSTRACT

An undersea hydraulic coupling member is disclosed having a bleed valve which opens to allow hydraulic fluid trapped in the coupling member to escape until the pressure is below a predetermined amount. The coupling member employs a poppet valve within a sleeve.

10 Claims, 1 Drawing Sheet

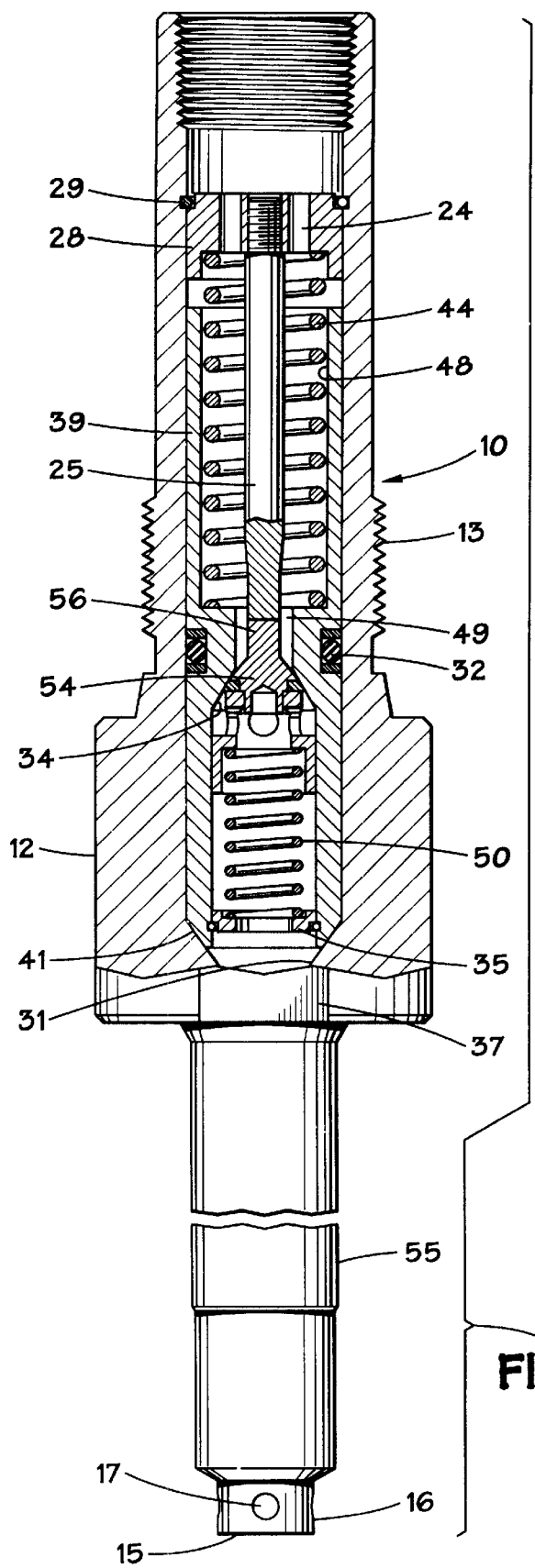
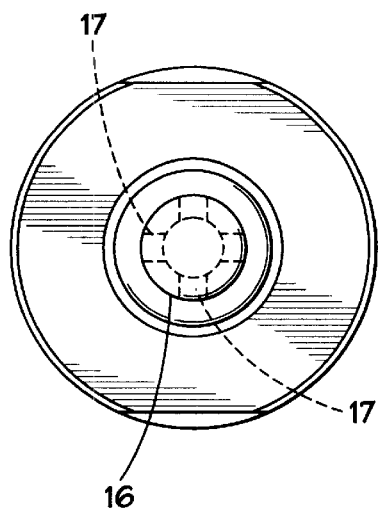
FIG. 2
FIG. 1

UNDERSEA HYDRAULIC COUPLING MEMBER

BACKGROUND OF THE INVENTION

1. Field of the Invention

This inventions relates, in general, to hydraulic couplings, and specifically to hydraulic couplings used in undersea drilling and production applications. More particularly, the invention involves a member of a subsea hydraulic coupling capable of bleeding off hydraulic pressure when it is disconnected from the corresponding coupling member.

2. Description of Related Art

Subsea hydraulic couplings are old in the art. The couplings generally consist of a male member and a female member with sealed fluid passageways connecting therebetween. The female member generally is a cylindrical body with a relatively large diameter longitudinal bore, or receiving chamber, at one end and a relatively small diameter longitudinal bore at the other. The small bore facilitates connections to hydraulic lines, while the larger bore seals and slidingly engages the male member of the coupling. The male member includes a cylindrical portion at one end having an outer diameter approximately equal to the diameter of the large bore in the female member of the coupling. The male member also includes a connection at its other end to facilitate connection to hydraulic lines. When the cylindrical portion of the male member is inserted into the large bore of the female member, according to various embodiments of the device, fluid flow is established between the male and female members.

The male and female members of a hydraulic coupling each typically include a poppet valve slidably received within the bore of each member. Each poppet valve typically includes a conical valve face which seats, in the closed position, against a valve seat in the bore. The poppet valve opens to allow fluid flow, and closes the poppet valve face against the corresponding valve seat within the bore to arrest the flow. Generally the poppet valve is spring-biased to the closed position. The valve also includes a valve actuator which may be a nose or stem extending from the apex of the valve face along the longitudinal axis of the poppet valve. Contact between the valve actuators of the male and female member poppet valves forces each valve face away from the valve seat and into the open position for fluid flow between the members. Some undersea coupling members do not have valve actuators, but instead utilize valves that open in response to fluid pressure from the opposing coupling member.

Typically, the male members and female members are attached to opposing manifold plates. In emergency situations, for example, storms, fires, hurricanes, etc., the manifold plates are quickly separated and the male and female members are disconnected. When the male and female members are disconnected, particularly in emergency situations, problems arise as a result of trapped hydraulic pressure in the lines. Safety valves in the subsea hydraulic systems are typically designed to close when hydraulic pressure in the system drops below a predetermined pressure. If hydraulic pressure is trapped subsea, safety valves in the hydraulic systems have a tendency to remain open due to the remaining pressure in the lines. It is undesirable for the safety valve to remain open due to trapped pressure, so to relieve the pressure, it has been suggested to bleed the hydraulic lines that are trapped subsea. Bleeding the lines also is done to avoid damage from blowouts to the hydraulic system. Therefore, if the hydraulic system is in danger of being severed or otherwise damaged due to storms, it then is desirable to disconnect the members and check off or seal one member while allowing the other member, which remains subsea, to bleed off trapped hydraulic pressure. At the same time, it is undesirable for seawater to enter the system through the coupling member that remains subsea.

Bleeding off of trapped hydraulic pressure solves the problem of dangerous high pressure in the hydraulic system which often may result in blowouts to the hydraulic system or safety valves failing to close when the couplings are disconnected. Preferably, to prevent seawater from entering the hydraulic system during bleeding, the bleed passage should include a check valve which permits flow in one direction only. The present invention solves all of these needs and requirements.

In U.S. Pat. No. 5,365,972 to Robert E. Smith III assigned to National Coupling Company, Inc. of Stafford, Tex., an undersea hydraulic coupling is shown, with at least one of the members having a bleed passage through the poppet valve and a bleed valve which opens to allow hydraulic pressure to escape through the bleed passage until the pressure is below a predetermined amount. The coupling of U.S. Pat. No. 5,365,972 discloses a bleed valve that slides within a sleeve in one of the coupling members. When the bleed valve opens due to excess line pressure, hydraulic fluid flows through the bleed valve, the sleeve and out a passage in the poppet valve of the member. The coupling of U.S. Pat. No. 5,365,972 discloses a pair of valves in the coupling member to facilitate bleeding hydraulic fluid that is trapped in the lines.

SUMMARY OF THE INVENTION

The present invention resides in a hydraulic coupling member of the foregoing type, that bleeds off trapped hydraulic fluid pressure when the member is disconnected from the corresponding coupling member. The present invention involves a bleeding mechanism using a sleeve in the coupling member and a poppet valve in the sleeve which allows trapped hydraulic fluid at high pressure to escape until the hydraulic pressure is decreased to a predetermined pressure. The present invention keeps seawater intrusion out of the lines in subsea equipment, thereby preventing contamination and corrosion.

BRIEF DESCRIPTION OF THE DRAWINGS

FIG. 1 is a partial section view of a male undersea hydraulic coupling member according to a preferred embodiment of the present invention.

FIG. 2 is an end view, partially in section, of a male member according to the embodiment of FIG. 1.

DESCRIPTION OF A PREFERRED EMBODIMENT

The coupling member of FIG. 1 comprises a male member 10, although the present invention may be employed in either a male or female coupling member. Typically, ten or more male members and female members are connected to opposing plates of a manifold which are held together by bolts or hydraulic members attached to the plates. The male members are commonly attached to one plate, while the female members are attached to an opposing plate so as to face the male members and align with them. The male and female members may be attached to manifold plates using various means, such as set screws or threads. Techniques for attaching the members to such manifold plates are well known to those skilled in the art.

In a preferred embodiment, male member includes handle 13, flange 12, cylindrical probe wall 55, tip 16 and probe face 15. The cylindrical probe wall 55 is adapted for sliding engagement with the female member of the coupling.

The body of the male member also is provided with a central bore 37. The bore 37 may have several variations in its diameter as it extends through the body of the male member 10. In a preferred embodiment, the first end of the bore is connected to radial ports 17. Preferably four radial ports are located in the tip of the male member. As will be described below, hydraulic fluid pressure from the opposing coupling member urges sleeve 39 axially to open the valve and allow hydraulic fluid to flow between the coupling members.

Sleeve 39 is positioned in the bore 37 of the male member. The first end of the sleeve has an inclined face 41 that abuts inclined shoulder 31 in the bore. The second end of the sleeve, when in the closed position shown in FIG. 1, is spaced from spring collar 28 which is held in the bore with clip 29. The spring collar 28 includes at least two passages 24 therethrough and an actuator 25 extending longitudinally therefrom. When sleeve 39 moves longitudinally so that inclined face 41 is spaced away from inclined shoulder 31, actuator 25 opens poppet valve 54 by contacting poppet valve actuator 56. The sleeve is urged longitudinally toward the spring collar 28 by the pressure of hydraulic fluid acting on the sleeve through the bore in the first end of the male member. Thus, hydraulic fluid entering ports 17 and flowing through bore 37 urges the sleeve 39 axially until the sleeve contacts spring collar 28. When the sleeve 39 moves axially, actuator 25 blocks the poppet valve and forces the poppet valve open to allow hydraulic fluid to move through passageway 49 in the sleeve and through passages 24 in the spring collar.

To keep the valve closed in the absence of hydraulic pressure entering the first end of the male member, spring 44 is positioned in bore section 48 in the sleeve 39. Preferably, spring 44 is a 350 psi coiled spring. Spring 44 biases the sleeve to the close position where inclined face 41 is engaged to inclined shoulder 31. Intermediate the sleeve is an O-ring 32 which provides a seal between the outer circumference of the sleeve and the bore in the coupling member.

If hydraulic fluid pressure is trapped in the fluid lines connected to the second end of the male member, the pressure urges the poppet valve 54 away from valve seat 34 in the sleeve, compressing spring 50 to allow bleeding of excess hydraulic pressure from the coupling member. Spring 50 is preferably a coiled 50 psi spring that is configured to allow bleeding of trapped hydraulic fluid until it reaches a predetermined level. Spring 50 is held in place by spring collar 35 which includes a passage therethrough and a clip to hold the spring collar in place. Preferably, spring 44 is larger and stronger than spring 50.

Thus, when the coupling member 10 shown in FIG. 1 is disconnected from the opposing coupling member, trapped hydraulic fluid pressure is permitted to flow through passages 24 in the spring collar, passage 48 in the sleeve 39, and past the poppet valve through passage 49, urging the poppet valve 54 open by compressing spring 50. Accordingly, hydraulic fluid pressure is allowed to escape out radial ports 17 until the pressure of the trapped hydraulic fluid is below a predetermined level.

FIG. 2 shows an end view, partially in section, of a coupling according to the embodiment of FIG. 1. In FIG. 2, four radial ports are shown in the tip 16 of the male member.

In the embodiment of FIGS. 1–2, the fluid pressure needed to open valve 54 typically is sufficient to crack open the valve a slight amount. Preferably, the spring 50 is selected that will allow trapped hydraulic fluid to bleed down to a pre-selected pressure, while preventing sea water from entering the lines remaining subsea. When the hydraulic coupling member of the present invention is connected to an opposing coupling member, hydraulic pressure in the lines will be sufficient to open the valve by urging the sleeve 39 axially until the poppet valve actuator 56 contacts actuator 25. As the sleeve 39 continues to move axially, the poppet valve is opened. When disconnected from the opposing coupling member, hydraulic fluid does not urge the sleeve axially, so the valve is closed.

A principle advantage of the hydraulic coupling member is bleeding of excess fluid pressure during emergency situations, when the male members and female members are disconnected. The plates of the manifolds often may be disconnected from one another to prevent damage to the hydraulic system. In a severe storm, for example, a floating drilling rig may be displaced substantially from the subsea coupling so that turning loose or other damage to the hydraulic system will result until the male member manifold plate is disconnected from the female member manifold plate. At the same time, it is often difficult to close safety valves with trapped hydraulic pressure remaining in the lines when the male member and female members are disconnected from one another.

The bleed valve allows disconnection of subsea hydraulic couplings while allowing excess pressure to bleed off, thereby allowing the safety valves to close, thereby avoiding blowouts from excess pressure in the hydraulic lines. The bleed valve in either the male member or female member or both relieves excess pressure in the hydraulic system at any time when the subsea coupling members are disconnected from one another. Although a preferred embodiment of the present invention is specifically adapted for use in subsea applications, the present invention also may be used in other environments. Such environments include those in which the female and male members of a coupling are separated from one another without adequate pressure reduction in the lines. The resulting buildup of pressure in the lines is obviated by utilizing the bleed valve in either or both the male and female coupling members.

Although variations in the embodiment in the present invention may not each realize all of the advantages of the invention, certain features may become more important than others in various applications of the device. The invention, accordingly, should be understood to be limited only by the scope of the appended claims.

What is claimed is:

1. An undersea hydraulic coupling member, comprising:
(a) a body having a longitudinal bare extending therethrough from a first end to a second end thereof; the first end of the body connectable to an opposing coupling member and the second end of the body connectable to a hydraulic line; the bore having a first internal shoulder intermediate the bore and an internal collar adjacent the second end of the body;
(b) a sleeve in the longitudinal bore, the sleeve having a second internal shoulder; the sleeve having a first end that seals against the first internal shoulder when the sleeve is in the closed position, and having a second end that abuts the internal collar when the sleeve is in the fully open position;

(c) a first spring extending between the internal collar and the sleeve for biasing the sleeve to the closed position against the first internal shoulder; the sleeve moving away from the first internal shoulder toward the fully open position when the body is connected to the opposing coupling member that provides hydraulic fluid pressure in the first end of the bore acting against the sleeve that is greater than the spring force of the first spring and any hydraulic fluid pressure in the second end of the bore acting against the sleeve;

(d) a poppet valve in the sleeve, the poppet valve in sealing engagement with the second internal shoulder to block fluid flow through the bore when the sleeve is in the closed position;

(e) an actuator extending between the collar and the poppet valve, the poppet valve becoming disengaged from the second internal shoulder to allow fluid flow through the bore when the sleeve begins moving toward the fully open position and the poppet valve abuts the actuator, the poppet valve becoming spaced further from the second internal shoulder until the sleeve reaches the fully open position when the second end of the sleeve abuts the collar; and (f) a second spring extending between the first end of the sleeve and the poppet valve for biasing the poppet valve against the second internal shoulder, the poppet valve disengaging from the second internal shoulder when the body is disconnected from the opposing coupling member and hydraulic fluid pressure in the second end of the bore acting against the poppet valve is greater than the spring force of the second spring and any hydraulic fluid pressure in the first end of the bore acting against the poppet valve.

2. The undersea hydraulic coupling member of claim 1 wherein the first spring is stronger than the second spring.

3. The undersea hydraulic coupling member of claim 1 further comprising a radial seal between the sleeve and the longitudinal bore of the coupling member.

4. The undersea hydraulic coupling member of claim 1 wherein the actuator is a longitudinal member in the longitudinal bore adjacent the second end of the body.

5. An undersea hydraulic coupling member, comprising:

(a) a body having a first end, a second end, a bore and a first shoulder in the bore; the first end and second end connectable to sources of hydraulic fluid pressure;

(b) a sleeve in the bore slideable from a first position against the first shoulder to a second position spaced from the first shoulder, a collar in the bore, and a first spring between the collar and the sleeve biasing the sleeve toward the first position, the sleeve having a second internal shoulder;

(c) a valve in the sleeve sealing against the second shoulder when the sleeve is in the first position, the valve becoming disengaged from the second shoulder when the sleeve is in the second position spaced from the first shoulder, the sleeve moving to the second position when the first end of the body is connected to a hydraulic fluid pressure source acting against the first end of the sleeve exceeding the bias force of the first spring aid any hydraulic fluid pressure acting against the second end of the sleeve, the second shoulder separating further from the valve until the second end of the sleeve abuts the collar; and (d) a second spring between the sleeve and the valve biasing the valve against the second shoulder, the valve being movable away from the second shoulder when the second end of the body is connected to a hydraulic fluid pressure source acting against the second end of the sleeve exceeding the bias force of the second spring and any hydraulic fluid pressure acting against the first end of the sleeve.

6. The undersea hydraulic coupling member of claim 5 further comprising an actuator positioned to contact the valve when the sleeve moves to the second position.

7. The undersea hydraulic coupling member of claim 5 wherein the fluid pressure to urge the sleeve toward the second position exceeds the fluid pressure to urge the valve toward the second position.

8. The undersea hydraulic coupling member of claim 5 further comprising a radial seal between the sleeve and the bore.

9. The undersea hydraulic coupling member of claim 5 wherein the shoulder in the bore comprises an inclined surface, and the shoulder in the sleeve comprises an inclined surface.

10. An undersea hydraulic coupling member comprising:

(a) a cylindrical body having an internal bore extending from a first end to a second end thereof, the first end connectable to an opposing coupling member and the second end connectable to a hydraulic line, an internal shoulder intermediate the internal bore; and an internal collar adjacent the second end of the internal bore;

(b) a sleeve in the central bore, the sleeve having a first end and a second end, an internal shoulder, and a first spring extending between the collar and the sleeve for urging the first end of the sleeve against the internal shoulder of the bore, the first end of the sleeve becoming spaced from the internal shoulder of the bore and the second end of the sleeve moving toward the internal collar when the body is connected to the opposing coupling member to provide sufficient hydraulic fluid pressure against the sleeve to compress the first spring;

(c) a valve in the sleeve and a second spring extending between the first end of the sleeve and the valve, the second spring urging the valve against the internal shoulder of the sleeve, the valve becoming spaced from the internal shoulder of the sleeve when the body is disconnected from the opposing coupling member and there is sufficient hydraulic fluid pressure against the valve to compress the second spring; and (d) an actuator extending between the collar and the valve for blocking the valve from moving toward the second end of the internal bore so the internal shoulder of the sleeve becomes spaced from the valve to allow hydraulic flow past the valve when the first end of the sleeve is spaced from the internal shoulder of the bore, the sleeve becoming further spaced from the valve until the second end of the sleeve abuts the collar.

* * * * *

UNITED STATES PATENT AND TRADEMARK OFFICE
CERTIFICATE OF CORRECTION

PATENT NO. : 6,474,359 B1
DATED : November 5, 2002
INVENTOR(S) : Robert E. Smith, III It is certified that error appears in the above-identified patent and that said Letters Patent is hereby corrected as shown below:

Column 6,
Line 1, please delete "aid" and replace with -- and --.

Signed and Sealed this

Eighteenth Day of February, 2003

JAMES E. ROGAN
*Director of the United States Patent and Trademark Office*